United States Patent [19]

Antonov

[11] Patent Number: 5,704,459

[45] Date of Patent: Jan. 6, 1998

[54] POSITIVE DISPLACEMENT COUPLING DEVICE

[75] Inventor: Roumen Antonov, Paris, France

[73] Assignee: Antonov Automotive Technologies B.V., Rotterdam, Netherlands

[21] Appl. No.: 582,994

[22] PCT Filed: Jul. 20, 1994

[86] PCT No.: PCT/FR94/00906

§ 371 Date: Jan. 23, 1996

§ 102(e) Date: Jan. 23, 1996

[87] PCT Pub. No.: WO95/03498

PCT Pub. Date: Feb. 2, 1995

[30] Foreign Application Priority Data

Jul. 23, 1993 [FR] France .................. 93 09125

[51] Int. Cl.[6] ............................ F16D 31/04
[52] U.S. Cl. .................. 192/61; 475/93; 475/108
[58] Field of Search ................ 475/91, 93, 104, 475/107, 108, 258, 267; 192/3.52, 12 B, 61, 105 C

[56] References Cited

U.S. PATENT DOCUMENTS

| | | | |
|---|---|---|---|
| 1,599,345 | 9/1926 | Pike | 475/108 X |
| 1,903,714 | 4/1933 | Frias et al. | 475/108 X |
| 2,730,218 | 1/1956 | Wickman | 192/61 |
| 3,130,607 | 4/1964 | Kraemer | 475/72 |
| 3,623,584 | 11/1971 | Hill | 192/61 |
| 5,456,642 | 10/1995 | Frost | 475/93 |

FOREIGN PATENT DOCUMENTS

| | | | |
|---|---|---|---|
| 910083 | 9/1972 | Canada | 192/61 |
| 351510 | 5/1989 | European Pat. Off. | F02B 67/04 |
| 403315 | 5/1909 | France . | |
| 601961 | 11/1924 | France . | |
| 845747 | 5/1938 | France . | |
| 1119770 | 1/1955 | France . | |
| 1191526 | 10/1959 | France . | |
| 254977 | 10/1927 | Italy | 192/61 |
| 61-52429 | 3/1986 | Japan | 192/61 |
| 1203398 | 8/1970 | United Kingdom | 192/61 |
| WO91/13275 | 9/1991 | WIPO | F16H 61/02 |
| 94/19624 | 9/1994 | WIPO | 475/258 |
| WO95/03498 | 2/1995 | WIPO | F16D 31/04 |

*Primary Examiner*—Khoi Q. Ta
*Attorney, Agent, or Firm*—Kenyon & Kenyon

[57] ABSTRACT

Volumetric coupling (38) having multiple hydraulic pumps, controlled by a ring (40) which links the discharge side directly to the suction side for each pump when the coupling is uncoupled, and seals the discharge side when the coupling is coupled.

17 Claims, 2 Drawing Sheets

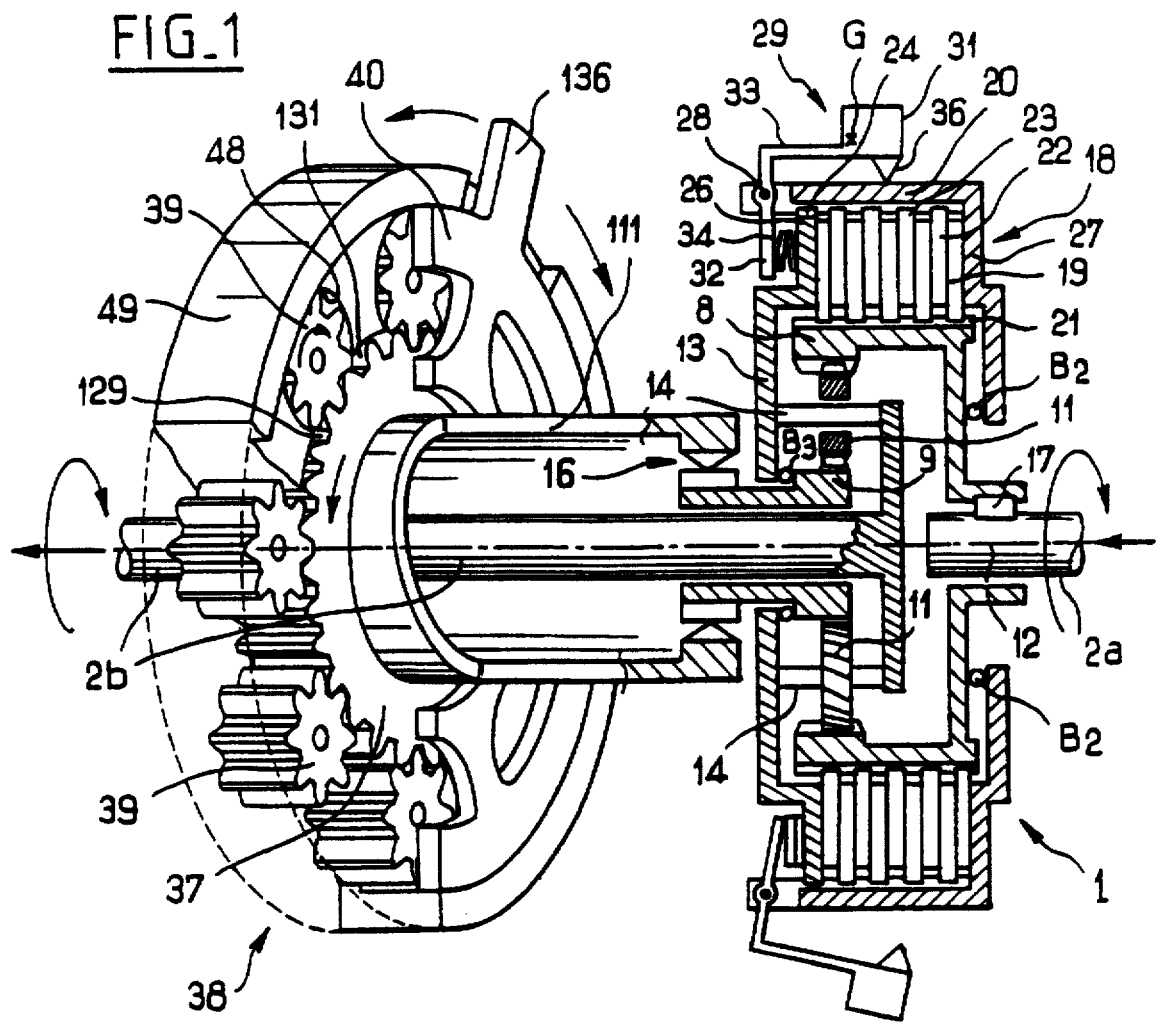
FIG_1
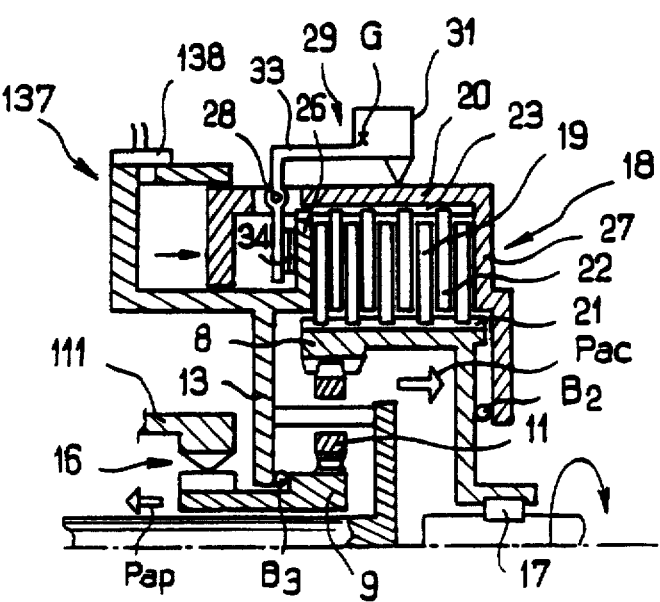
FIG_2

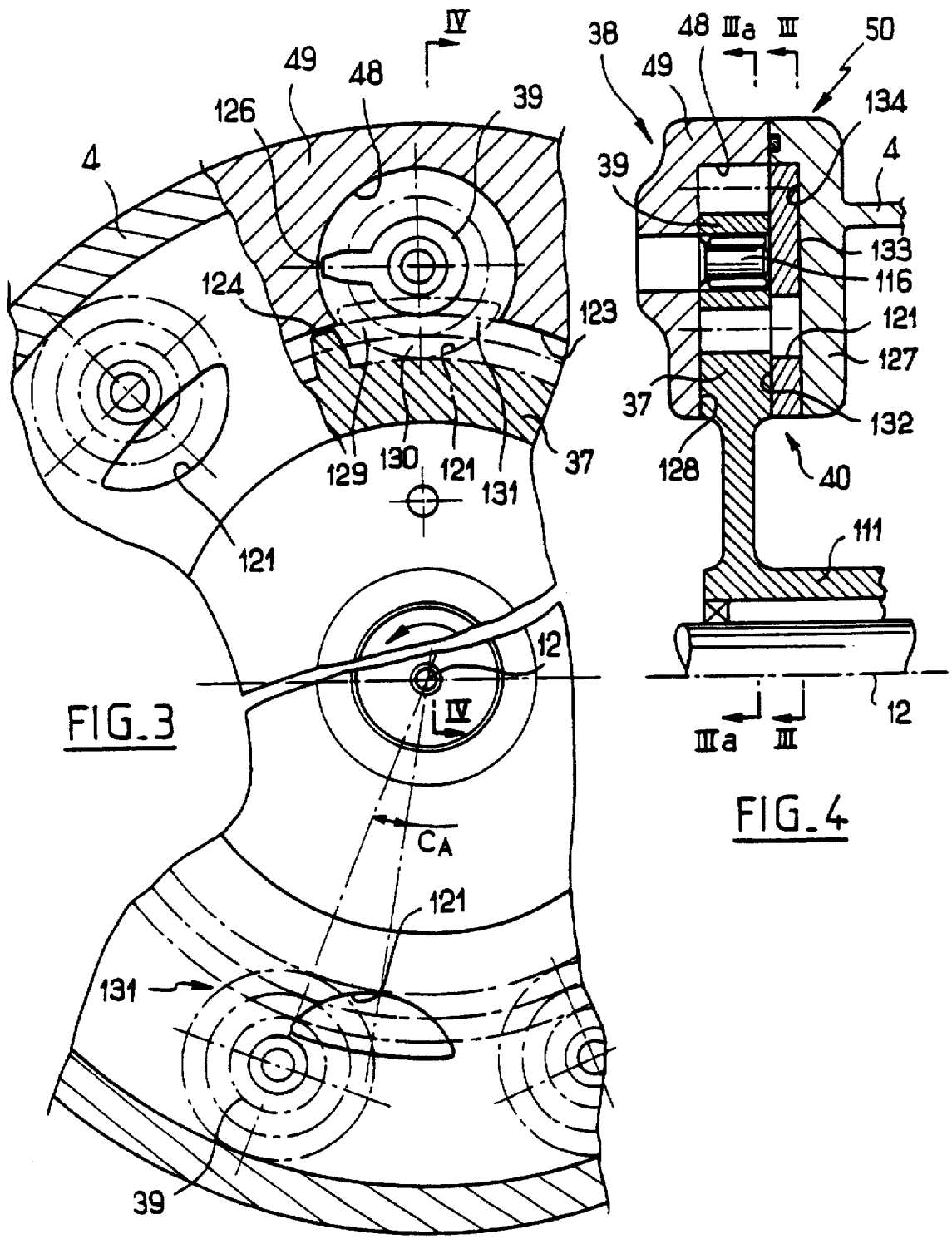

POSITIVE DISPLACEMENT COUPLING DEVICE

This invention concerns a positive displacement coupling device, of the type in which the release or blockage of the delivery of a hydraulic pump is controlled in order selectively to prevent or enable relative rotation between two elements of the pump.

The present invention also concerns a transmission device with at least two ratios and in which the gradual starting function is ensured by a coupling device of the type described above.

FR-A-1 191 526 and U.S. Pat. No. 3,130,607, for example, disclose positive displacement coupling devices comprising a common toothed member meshing with several planet gears supported in rotation in a cage, thereby to provide as many hydraulic individual pumps as there are planet gears. In fact, in numerous applications it is necessary to make use of several individual pumps for the pressure generated in the delivery area of each pump when the delivery is blocked not to reach prohibitive levels.

In known coupling devices, delivery ways connect the delivery area of the various individual pumps to a valve that controls the release or blockage of the individual pumps' deliveries. When the delivery is blocked the common toothed member can no longer turn in relation to the cage and coupling therefore occurs between them.

There are two reasons why in practice the common toothed member has a relatively large diameter. On the one hand, the common toothed member must mesh with several planet gears, which means that the former has a longer perimeter; on the other hand, the greater the diameter of the common toothed member, the greater the torque of the force produced by each individual pump when its delivery is blocked.

Consequently, the higher the coupling torque to be achieved, the greater the number of planet gears and diameter of the common toothed member. When the delivery of the individual pumps is released, the flow of hydraulic fluid produced by the pumps is proportional to the number of planet gears and diameter of the common toothed member. In conclusion, obtaining a given coupling torque necessarily results in a given flow of hydraulic fluid when the device is in the uncoupled state.

It has been found that in most situations, these flow rates reach extremely high levels, corresponding to very high speeds of circulation of oil in the channels that form the link between the delivery areas, control valve, oil reservoir and then from the latter to the inlet areas. In the vast majority of cases, these speeds are totally prohibitive whatever the design envisaged for the channels and the valve. This results in noisy operation, overheating and loss of pressure, and makes it impossible to achieve perfect uncoupling.

The object of the present invention is therefore to provide a positive displacement coupling device which can be used in numerous practical situations, particularly for gradual coupling between the driving wheels of a vehicle and a thermal engine on starting, which is technically simple and offers good uncoupling qualities without the pressure of the hydraulic fluid during the coupled state being excessive.

According to the invention, the positive displacement coupling device comprising a common toothed member meshing with at least one planet gear mounted in rotation in a housing to form with each planet gear and the housing an individual hydraulic pump comprising an hydraulic fluid inlet area and an hydraulic fluid delivery area on either side of a meshing area between the common toothed member and each planet gear, and distribution means selectively to enable and prevent the flow of hydraulic fluid from the delivery area of each pump, is characterised in that the distribution means comprise a cutaway movable organ adjacent to one of the faces of each planet gear, and in that the movable organ can be moved between a release position in which it establishes, due to its cutaway structure, direct communication between the inlet and delivery areas, and a coupling position in which it blocks off at least one of the two inlet and delivery areas associated with each planet gear.

In the device according to the invention, the delivery and inlet ways are no longer centralised. They are extremely short and the cutaway sections that form these ways can impart to the flow as large a cross section as is deemed desirable to bring the oil's speeds of circulation to a reasonable level. Both the speed and distance to be travelled by the oil are reduced at the same time, and each of these two reductions involves a corresponding reduction in loss of pressure. The latter is thus brought to a reasonable level. In order to control the blockage or release of the individual pumps' delivery, the movable organ is moved so that the cutaway section or sections either isolate or connect the or each delivery area to an inlet area. Thus, when each delivery area is isolated, high pressure is practically non-existent except in the delivery area of the or each individual pump, which reduces to an absolute minimum problems of high pressure sealing.

Certainly, FR-A-601 961 and FR-A-1 119 770 disclose coupling devices in which a cutaway rotary organ control the flow of a gear pump. But according to these documents the cutaway rotary organ, instead of being adjacent to a face of the planet gear or gears, is separated therefrom by a wall with at least one port through it. Furthermore, the communication that the cutaway rotary organ is able to establish between the pump's delivery and inlet is only indirect, since this communication also goes through the said port, through a reservoir, through an inlet port, etc.

According to another aspect of the invention, the transmission device with at least two ratios and gradual starting, comprising a gradual coupling device, a differential mechanism having an inlet element, an outlet element and a reaction element connected to a support by a free wheel to make the differential mechanism operate selectively according to a first transmission ratio in which the reaction element tends to turn in relation to the support in a direction prevented by the free wheel, and according to a second transmission ratio in which the reaction element turns in relation to the support in the direction permitted by the free wheel, is characterised in that the coupling device is mounted operationally between the support and a housing of the transmission device, and comprises a common toothed member meshing with at least one planet gear mounted in rotation in a housing to form with each planet gear and the housing an individual hydraulic pump comprising an hydraulic fluid inlet area and an hydraulic fluid delivery area on either side of a meshing area between the common toothed member and each planet gear, and a movable cutaway organ adjacent to one of the faces of each planet gear, and in that the movable organ can be moved between a release position in which it establishes, due to its cutaway structure, direct communication between the inlet and delivery areas and a coupling position in which it blocks off at least one of the two inlet and delivery areas associated with each planet gear.

Other details and advantages of the invention will emerge more clearly from the following description relating to an example which is in no way restrictive.

In the attached drawings:

FIG. 1 is a partial cutaway diagram, in perspective, of a transmission device according to the invention, the diagram being in part sectional;

FIG. 2 shows a details of FIG. 1 when the differential mechanism is working in reducer operation;

FIG. 3 is a front sectional view of a coupling device according to the invention, along III—III in FIG. 4, with cutaway sections, in the uncoupled state at the top of the figure and in the coupled state at the bottom of the Figure, the right-hand top part, however, being a sectional view along IIIa—IIIa in FIG. 4;

FIG. 4 is a sectional view along IV—IV in FIG. 3.

The two-ratio transmission device shown in FIG. 1, intended in particular for a motor car, comprises a differential mechanism 1, mounted between an input shaft 2a and an output shaft 2b of the transmission.

Input shaft 2a is coupled to the output shaft (not shown) of a vehicle motor (not shown) without the interposition of a clutch. Output shaft 2b may be connected to the input of a differential to drive the driving wheels of a vehicle. A manually-operated forward gear/reverse gear reverser and/or one or more other mechanisms with two or more ratios to increase the number of transmission ratios available may be interposed between output shaft 2b and the differential input.

Input 2a and output 2b shafts are immobilised axially in relation to a transmission casing (not shown in FIG. 1).

The differential mechanism comprises a crown wheel 8 with internal teeth and a sun gear 9 with external teeth, both engaging with planet gears 11 supported, at equal angular intervals around axis 12 of the transmission device, by a planet gear carrier 13 connected rigidly to output shaft 2b. The assembly takes the form of an epicyclic train, all the geometrical centre lines of the gears being parallel to each other.

Planet gears 11 can swivel freely around eccentric trunnions 14 of planet gear carrier 13. Sun gear 9 can turn freely around axis 12 of the transmission device in relation to output shaft 2b which it surrounds. However, a free wheel device 16 prevents sun gear 9 from turning backwards, i.e. in the opposite direction to the normal direction of rotation of input shaft 2a, in relation to a support 111 shaped like a hub.

Crown wheel 8 is connected in rotation, but free to slide axially in relation to input shaft 2a of the mechanism by the medium of splines symbolised by 17.

A clutch 18 is arranged around crown wheel 8. It comprises a pack of annular discs 19 alternating with annular discs 22. Discs 19 are connected in rotation with crown wheel 8 with the possibility of sliding axially. For this purpose, discs 19 have internal teeth engaged in grooves 21 integral with crown wheel 8. Discs 22 are connected in rotation, with the possibility of sliding axially, to planet gear carrier 13. For this purpose, a cage 20, on its radially interior face, has grooves 23 in which are engaged in an axially sliding manner at one end the external teeth of discs 22 and at the other end outer teeth 24 of the planet gear carrier 13.

The pack of discs 19 and 22 may be squeezed together axially between a retaining plate 26 integral with planet gear carrier 13 and a movable plate 27 which forms part of cage 20.

Cage 20 supports centrifugal weights 29 arranged in a ring around clutch 18.

The weights are thus connected in rotation to output shaft 2b of the transmission device.

Each weight has a solid body 31 located radially around the outside of discs 19 and 22 and an operating tip 32 resting against an external face of fixed plate 26 by the medium of a Belleville spring 34. Tip 32 is connected to solid body 31 by a bent arm 33 articulated to cage 20 around a geometrical axis 28 positioned tagentially in relation to axis 12 of the device. The WO-A-91/13275 describes some favourable arrangements for the articulated fitting of such weights. Centre of gravity G of the weight is located inside or near solid body 31, in a position which in relation to axis 28 is at a certain distance measured parallel to axis 12 of the device.

Thus the rotation of planet gear carrier 13 tends to make bodies 31 of weights 29 pivot radially outwards around their tangential axis 28 under the action of their centrifugal force, causing them to pass from a lowered position defined by a stop 36 against cage 20 (top of FIG. 1 and FIG. 2) to a distanced position shown at the bottom of FIG. 1.

The passage from one of these position to the other is accompanied by a relative axial displacement between tip 32 and articulation axis 28 of the weight and thus between tip 32 and cage 20. An axial stop B2 interposed between cage 20 and crown wheel 8 transmits to the latter the axial movements of cage 20 in the direction of displacement corresponding to the centrifugal distancing of weights 29.

Furthermore, the displacement of cage 20 in relation to tip 32 causes a relative closing-in movement between tip 32 and movable plate 27 of clutch 18. This relative displacement may correspond to the compression of Belleville spring 34 and/or the displacement of movable plate 27 towards fixed plate 26 in the direction of squeezing in clutch 18.

When the transmission system is at rest as shown at the top of FIG. 1, Belleville spring 34 transmits to cage 20, by the medium of weights 29 in the lowered position, a force which squeezes clutch 18 so that input shaft 2a is coupled in rotation with output shaft 2b and the mechanism establishes direct drive capable of transmitting torque up to a certain maximum defined by the squeezing force of the Belleville spring.

The teeth of crown wheel 8, planet gears 11 and sun gear 9 are helical. Thus, in each pair of teeth engaging under load, opposing end thrusts are created proportional to the peripheral force transmitted and thus to the torque on input shaft 2a and the torque on output shaft 2b. Planet gears 11, which engage not only with crown wheel 8 but also with sun gear 9, undergo two opposing axial reactions which cancel each other out, and sun gear 9, taking into account its engagement with planet gears 11, undergoes an end thrust Pap which is equal in intensity and opposed to end thrust Pac of crown wheel 8. Thrust Pap of sun gear 9 is transmitted to the housing through the medium of a stop B3 and planet gear carrier 13. The direction of helical pitch of the teeth is selected so that end thrust Pac (FIG. 2) originating in crown wheel 8 when it transmits a positive torque is in a direction which tends, through the medium of stop B2, to distance movable plate 27 from clutch retaining plate 26 and thus release clutch 18, keep weights 29 in their lowered position and compress spring 34, as shown in FIG. 2.

Assuming that this situation has been reached (FIG. 2), we shall now describe the basic operation of differential mechanism 1. As long as the torque transmitted to the module by input shaft 2a is such that end thrust Pac in crown wheel 8 suffices to compress Belleville spring 34 and keep weights 29 in the lowered position shown in FIG. 2, the distance between retaining plate 26 and movable plate 27 of the clutch is such that discs 19 and 22 slide against each other without torque being transmitted between them. In this case, planet gear carrier 13 may turn at a different speed to that of input shaft 2a, and tends to be immobilised by the load connected to the mechanism's output shaft 2b. As a result planet gears 11 tend to behave like movement reversers, i.e. to make sun gear 9 turn in the opposite direction to the direction of rotation of crown wheel 8. But this is prevented by free wheel 16, support hub 111 being assumed for the moment to be stationary. Sun gear 9 is then immobilised by free wheel 16 and planet gear carrier 13 turns at a speed which is between the zero speed of sun gear 9 and the speed of crown wheel 8 and input shaft 2a. The mechanism thus works in reducer operation. If the speed of rotation increases and the torque remains unchanged, there comes a time when the centrifugal force of weights 29 produces between retaining plate 26 and movable plate 27 a squeezing axial force greater than end thrust Pac, and movable plate 27 is pushed towards plate 26 to achieve direct drive as shown at the bottom of FIG. 1.

When clutch 18b is squeezed in, the teeth no longer work, i.e. they no longer transmit any force and therefore do not generate any end thrust. Thus, the end thrust due to centrifugal force may exert itself fully to squeeze plates 26 and 27 together.

It may then be that the speed of rotation of output shaft 2a decreases, and/or the torque to be transmitted increases, to the point where weights 29 no longer guarantee a squeezing force in clutch 18 sufficient to transmit the torque. In this case, clutch 18 begins to slip. The speed of sun gear 9 gradually drops to zero. Free wheel 16 immobilises the sun gear and tooth force Pac re-emerges to release the clutch, so that the mechanism then works in reducer operation as described with reference to FIG. 2.

Belleville spring 34 has a dual purpose. On the one hand, by squeezing the clutch together when the transmission system is at rest, it establishes a mechanical coupling between the mechanism's input and output shafts. The stationary vehicle is thus held back by the engine when the latter is itself stationary.

On the other hand, Belleville spring 34 enables the mechanism to operate in direct drive for relatively slow speeds when the centrifugal force, proportional to the square of the speed, would be so weak that the least torque to be transmitted would cause, in a manner undesirable in practice, the maintenance of or tendency to return to reducer operation.

Hub 111 is integral with impeller 37 of a starter brake 38.

As FIGS. 3 and 4 also show, brake 38 comprises a geared positive displacement coupling device, whose impeller 37 is a sun gear mounted in rotation about axis 12 and engaging with eight planet gears 39 whose axes of rotation are parallel to axis 12 and located around the latter. Sun gear 37 forms, with each planet gear 39, an individual hydraulic gear pump. An annular housing 50, with a U-shape open towards axis 12, encases the periphery of sun gear 37 and encloses planet gears 39.

Housing 50 comprises a flange 127 integral with casing 4 and a cage 49 fixed and sealed to flange 127. Cage 49 comprises an interior peripheral wall 123 which defines cavities 48 for the planet gears. Wall 123 is sealed by proximity with the tips 124 of the teeth of sun gear 37 and 126 of the teeth of planet gears 39, except in the areas of engagement 130. Cage 49 also comprises a shoulder 128 which is sealed by proximity with one of the faces of sun gear 37 round the outer periphery of the latter, and with the corresponding face of planet gears 39.

Thus, cage 39 seals one of the axial ends of each space between the teeth of sun gear 37 and of planet gears 39, and also seals the peripheral openings of the said spaces which are out of engagement. Trunnions 116 fixed to cage 49 support planet gears 39 in rotation.

Interposed between flange 127 on one side and sun gear 37 and planet gears 39 on the other, is a distributor ring 40 in the shape of a radial annular plate which is in direct contact with sun gear 37 and planet gears 39.

For each planet gear 39, ring 40 has a cutaway section 121 which communicates with some of the spaces between the teeth of sun gear 37. Apart from cutaway sections 121, distributor ring 40 has a flat face 132, facing sun gear 37 and planet gears 39, ensuring a sealed contact with the adjacent faces of sun gear 37 and planet gears 39 so as to seal the spaces between the teeth of sun gear 37 and planet gears 39. Thus the spaces between the teeth are sealed on all sides except when they communicate with a cutaway section 121 or when they communicate with each other in the area of engagement 130. Planet gears 39 are positioned axially between shoulder 128 of cage 49 and face 132 of ring 40. Ring 40 is supported with the possibility of rotation around axis 12 both in relation to casing 4 and cage 49 which is fixed to it and in relation to sun gear 37.

Distributor ring 40 may thus assume around axis 12 a brake release angular position, shown at the top of FIG. 3, in which each cutaway section 121 causes an inlet area 129 of the individual pump to communicate with a delivery area 131. In a known way for gear pumps, inlet area 129 corresponds to the area where the teeth of sun gear 37 and planet wheel concerned 39 disengage from each other and the delivery area 131 corresponds to an area where the teeth of sun gear 37 and the planet gear concerned 39 begin to engage with each other, taking into account the directions of rotation shown by the arrows in FIG. 3. The inlet 129 and delivery 131 areas are therefore located on either side of engagement area 130. In the release position, the delivery of each pump communicates with the inlet by the medium of the associated cutaway section 121, practically without loss of pressure, since the oil simply needs to pass from the delivery into cutaway section 121, then from the same cutaway section 121 into the inlet, without having to travel any distance apart from that defined by cutaway section 121. Thus impeller 37 can turn without resistance in relation to housing 50 integral with housing 4 of the transmission device.

Through the rotation of distributor ring 40 on its maximum angular travel CA starting from the brake release position, cutaway sections 121 may be caused to reach an angular coupling position, shown at the bottom of FIG. 3, in which they no longer communicate with the spaces between the teeth of sun gear 37 and planet gears 39 which are in delivery area 131.

In the coupling position, the delivery of each individual hydraulic pump is blocked and this blocks sun gear 37, with the exception, should the occasion arise, of residual rotation permitted by leakage.

Between the two extreme positions which have just been described, distributor ring 40 may occupy any intermediate position corresponding to a greater or lesser but not absolute braking of hub 111, integral with sun gear 37.

In the embodiment shown, distributor ring 40 is relatively thin and cutaway sections 121 are through-holes. On the side closest to flange 127, ring 40 has a flat face 133 which is in sealed contact with a corresponding flat face 134 of flange 127 to seal off cutaway sections 121 on the side away from the teeth.

FIG. 1 is a diagram of distributor ring 40 with a control tongue 136 connected to its periphery. In practice, tongue 136 may be connected to manual or automatic control system for setting the vehicle in motion gradually.

The general operation of the transmission device is as follows.

When the vehicle and engine are stationary, the differential mechanism is at rest in the situation shown at the top of FIG. 1, i.e. direct drive due to Belleville spring 34, so that clutch 18 connects the input and output shafts 2a and 2b regardless of the state of positive-displacement brake 38.

Before starting the engine, the vehicle having to remain stationary, ring 40 is placed in the release position (top of FIG. 3) and, by the medium of a rotating sealed connection 138, an annular jack 137 (FIG. 2), acting between planet gear carrier 13 and cage 20 is activated to release the clutch against the action of Belleville springs 34. To simplify the drawing, jack 137 has not been shown in FIG. 1. It was only made necessary due to the presence of Belleville spring 34 which itself is a non-essential improvement. When jack 137 is activated and ring 40 is in the uncoupled position, input shaft 2a drives crown wheel 8, and this causes the reverse rotation of sun gear 9 since planet gear carrier 13 is immobilised by the vehicle being kept stationary. The reverse rotation of sun gear 9 is transmitted by free wheel 16 to sun gear 37 of brake 38, whose rotation is permitted by positioning of ring 40 in the release position. This creates a neutral situation, i.e. uncoupling between the input and output shafts 2a and 2b when the vehicle is stationary (output shaft 2b stationary) while input shaft 2a is turning. This function performed by brake 38 is the reason why the clutch or torque converter conventionally mounted between the vehicle's engine and input shaft 2a of the transmission device can be eliminated. In order to set output shaft 2b in motion gradually, ring 40 is made gradually to pass into the coupling position so as gradually to brake impeller 37 by means of an increasing loss of pressure in the oil passing through cutaway sections 121. This may be achieved manually or by means of an automatic control system.

This gradually brakes, and finally totally stops, support hub 111 and with it sun gear 9, and gradually sets planet gear carrier 13 and thus output shaft 2b in rotation. At this stage, the pressure in jack 137 may be released and then the transmission device works in reducer operation or direct drive in the manner described above.

When brake 38 is in the released state the relatively heavy flow of oil from each individual hydraulic pump has only a very short distance to travel in the cutaway section 121 to which it corresponds, apart from the distance for which it is carried through the teeth.

The invention is in no way limited to the embodiment described and shown. Clutch 18 may be controlled by a completely different means than those described, for instance manually or even by a jack operated by an hydraulic or electronic control circuit.

Brake 38 may be made differently, for instance with two distributor rings, one on each side of the sun gear and planet gears, to further increase the ease of flow in the released state.

On the ring 40 side, the housing, i.e. flange 127 in the example, may be made smaller to eliminate the areas which are remote from the possible positions of cutaway sections 121.

There may only be one planet gear, with for example a counter-weight in a diametrically opposite position.

In order to isolate the delivery areas, each cutaway section may also be displaced in relation to its associated inlet area. In this case, the space isolated comprises the delivery area and the corresponding cutaway section, but the result is the same, except that the possibility of high-pressure hydraulic fluid leaks is greater.

Cutaway sections 121 could communicate with each other.

I claim:

1. A positive displacement coupling device comprising a common toothed member (37) engaging with at least one planet gear (39) mounted in rotation in a housing (50) to form with each planet gear and the housing an individual hydraulic pump comprising an hydraulic fluid inlet area (129) and an hydraulic fluid delivery area (131) on either side of an engagement area (130) between said common toothed member (37) and each platlet gear (39), and distribution means (40) selectively to enable and prevent the flow of hydraulic fluid from delivery area (131) of each pump, characterised in that the distribution means comprise a cutaway movable organ (40) adjacent to one of the faces of each planet gear (39), and in that said movable organ (40) can be moved between a release position in which a recess of said movable organ (40) simultaneously opens into said inlet (129) and delivery (131) areas thereby to establish a direct communication between said inlet (129) and delivery (131) areas, and a coupling position in which it blocks off at least one of the two inlet (129) and delivery (131) areas of each planet gear (39).

2. A transmission device with at least two ratios comprising a differential mechanism (1) having an input element (8), an output element (13) and a reaction element (9) connected to a support (111) by a free wheel (16) to make the differential mechanism operate selectively according to a first transmission ratio in which said reaction element (9) tends to turn in relation to said support (111) in a direction prevented by said free wheel (16), and according to a second transmission ratio in which said reaction element (9) turns in relation to said support (111) in the direction permitted by said free wheel (16), wherein a coupling device (38) is mounted operationally between said support (111) and a housing (4) of the transmission device, and comprises a common toothed member (37) engaging with at least one planet gear (39) mounted in rotation in a housing (50) to form with each planet gear and the housing an individual hydraulic pump comprising an hydraulic fluid inlet area (129) and an hydraulic fluid delivery area (131) on either side of an engagement area (130) between said common toothed member (37) and each planet gear (39), and a movable cutaway organ (40) adjacent to one or the faces of each planet gear (39), and wherein said movable organ (40) can be moved between a release position in which it establishes, due to its cutaway structure, direct communication between said inlet (129) and delivery (131) areas and a coupling position in which it blocks off at least one of the two inlet (129) and delivery (131) areas of each planet gear (39).

3. A device according to claim 1, characterised in that said movable organ (4) is an organ mounted with the possibility of rotation around axis (12) of said common toothed member (37) for movement between the coupling and release positions.

4. A device according to claim 1, comprising several planet gears, characterised in that said movable organ (40) has several cutaway sections (121) which, when said movable organ (40) is in the release position, are each causing the inlet (129) and delivery (131) areas of a same respective individual hydraulic pump to communicate.

5. A device according to claim 1, in which the axes of said common toothed member (37) and planet gear (39) are parallel, characterised in that said movable organ (40) is in the form of a plate.

6. A coupling device according to claim 1, characterised in that said movable organ (40) forms a ring around axis (12) of said common toothed member (37).

7. A coupling device according to claim 1, characterised in that said movable organ (40) also has the mechanical function of axially immobilising each planet gear between the said movable organ and an opposing face (128), belonging to said housing (50).

8. A coupling device according to claim 6, characterised in that said movable organ (40) is also in a sealed relationship with said common toothed member (37), in order to seal the ends of some at least of the spaces between teeth of the common toothed member which are away from said cutaway sections (121).

9. A device according to claim 1, characterised in that said housing (50), at the location of each planet gear, has at least one U section surrounding said planet gear (39) and said movable organ (40).

10. A device according to claim 1, characterised in that at least one cutaway section (121) is cut throughout said movable organ (40), and in that said movable organ (40) has one face facing away from said at least one planet gear (39) and being in sealed contact with an adjacent wall (134) of said housing (50), at least around each cutaway section (121).

11. A device according to claim 2, characterised in that said movable organ (4) is an organ mounted with the possibility of rotation around axis (12) of said common toothed member (37) for movement between the coupling and release positions.

12. A device according to claim 2, comprising several planet gears, characterised in that said movable organ (40) has several cutaway sections (121) which, when said movable organ (40) is in the release position, are each causing the inlet (129) and delivery (131) areas of a same respective individual hydraulic pump to communicate.

13. A device according to claim 2, in which the axes of said common toothed member (37) and planet gear (39) are parallel, characterised in that said movable organ (40) is in the form of a plate.

14. A coupling device according to claim 2, characterised in that said movable organ (40) forms a ring around axis (12) of said common toothed member (37).

15. A coupling device according to claim 2, characterised in that said movable organ (40) also has the mechanical function of axially immobilizing each planet gear between the said movable organ and an opposing face (128), belonging to said housing (50.

16. A device according to claim 2, characterised in that said housing (50), at the location of each planet gear, has at least one U section surrounding said planet gear (39) and said movable organ (40).

17. A device according to claim 2, characterised in that at least one cutaway section (121) is cut throughout said movable organ (40), and in that said movable organ (40) has one face facing away from said common toothed member (37) and being in sealed contact with an adjacent wall (134) of said housing (50), at least around each cutaway section (121).

* * * * *

UNITED STATES PATENT AND TRADEMARK OFFICE
CERTIFICATE OF CORRECTION

PATENT NO. : 5,704,459
DATED : January 6, 1998
INVENTOR(S) : Roumen Antonov

It is certified that error appears in the above-identified patent and that said Letters Patent is hereby corrected as shown below:

Column 8, line 9, delete "platlet" and insert --planet--;

Column 8, line 42, delete "or" and insert --of--;

Signed and Sealed this

Twelfth Day of January, 1999

Attest:

Attesting Officer     *Acting Commissioner of Patents and Trademarks*